United States Patent [19]
Matsumoto et al.

[11] 3,836,919
[45] Sept. 17, 1974

[54] AUTOMATIC FOCUSING DEVICE FOR USE WITH A PHOTOGRAPHIC CAMERA

[75] Inventors: Seiichi Matsumoto, Tokyo; Kuzuya Hosoe, Kawasaki; Noritaka Mochizuki, Zushi, all of Japan

[73] Assignee: Canon Kabushiki Kaisha, Tokyo, Japan

[22] Filed: Dec. 8, 1972

[21] Appl. No.: 313,518

Related U.S. Application Data

[63] Continuation-in-part of Ser. No. 204,843, Dec. 6, 1971, abandoned.

[30] Foreign Application Priority Data

Dec. 8, 1970 Japan............................ 45-108770
Dec. 28, 1970 Japan............................ 45-128420
Dec. 8, 1971 Germany.......................... 2160901

[52] U.S. Cl.................... 95/44 C, 250/208, 356/5, 356/6
[51] Int. Cl. ........................................... G03b 3/00
[58] Field of Search ........ 95/44; 250/208, 209, 210; 356/5, 6

[56] References Cited
UNITED STATES PATENTS
3,682,071 8/1972 Hosoe................................ 95/44 C

*Primary Examiner*—Richard M. Sheer
*Assistant Examiner*—Richard A. Wintercorn
*Attorney, Agent, or Firm*—Flynn & Frishauf

[57] ABSTRACT

Disclosed is an automatic focusing device including a radiation source for projecting a radiant ray such as a light ray or the like to an object, light receiving elements for detecting the reflected radiant ray from the object, a chopper or a mirror for time-sharing the radiant ray into two projected beams, and a mechanism for arbitrarily varying the distance between the merging point of the two beams and the radiation source, whereby the distance to the object is optically and photoelectrically measured by utilizing the fact that the images resulting from the two projected beams, respectively, are superposed on each other at the surface of the light receiving elements only when the merging point of the two projected beams lies on the object. Also disclosed are various arrangements for detachably mounting the said automatic focusing device or any other automatic focusing device on a photographic camera or the like.

32 Claims, 21 Drawing Figures

FIG. 2(A)
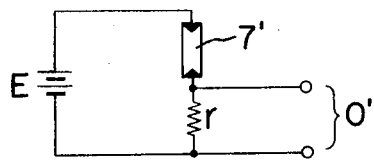
FIG. 2(B) FIG. 2(C)
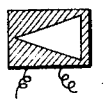 
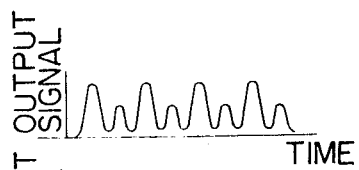
FIG. 2(D)
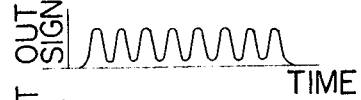
FIG. 2(E)
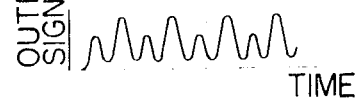
FIG. 2(F)
FIG. 3
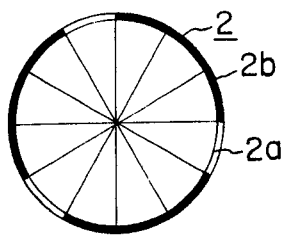
FIG. 4
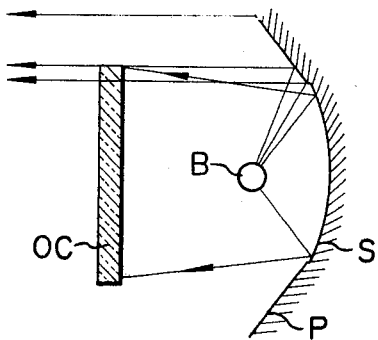

AUTOMATIC FOCUSING DEVICE FOR USE WITH A PHOTOGRAPHIC CAMERA

This application is a continuation in part of U.S. Pat. application Ser. No. 204,843 filed Dec. 6, 1971 now abandoned.

BACKGROUND OF THE INVENTION

1. Field of the Invention

This invention relates to improvements in an automatic focusing device, and more particularly to a device for measuring the distance of an object by utilizing radiant rays emitted from a radiation source installed in a photographic camera and reflected by the object being photographed in order to adjust automatically the focal position of the photographic camera when photographing the object, and also to an arrangement for detachably mounting said automatic focusing device or any other focusing device on a photographic camera or the like.

2. Description of the Prior Art

Most of the automatic focusing devices customarily used in photographic cameras have been intended to accomplish focusing by utilizing light beams from an object being photographed. Such conventional systems utilizing only the light from the object have had the disadvantage that focusing sometimes cannot be carried out, depending on the pattern of the object, or that a great deal of attention must be paid to the design of a photoelectric detecting portion for detecting the light from the object and converting it into electrical signals.

For example, if the pattern of the object consists of equally spaced stripes or has low contrast or low brightness, many limitations and difficulties would be involved in effecting a distance measurement by utilizing the light from such object. This would in turn lead to the inconvenience that light receiving elements for effecting photoelectric detection must be specially designed as disclosed in U.S. Pat. No. 3,529,528. German Pat. Utility Model No. 1,974,276 also discloses an automatic focusing device of the so-called double-image registration type, but this may fail to fully accomplish the focusing operation depending on the patterns of the objects.

Further, U.S. Pat. No. 2,999,436 discloses a focusing system which utilizes the fact that a highfrequency component contained in the scanning signal becomes greater when the object is clearly focused during scanning a part of the object, but this system is inferior in accuracy of the distance measurement for plain objects or objects of low contrast.

U.S. Pat. No. 3,336,851 shows another automatic focusing device that depends upon high contrast in a portion of the picture for the operability of its scanning device.

In U.S. Pat. No. 3,367,254, there is shown a system whereby deviation between upper and lower images is detected as a phase difference signal in accordance with the principle of the range finder of the upper-and-lower image registration type. This system, however, could not obtain a clear phase difference output for objects whose pattern is asymmetric with respect to the reference line between the upper and lower images, and consequently has difficulties in achieving accurate distance measurement.

Finally, British Pat. No. 1,180,155 shows a system which utilizes the fact that when an image, carried by a light beam passed through an aperture spaced apart from the optical axis of a light receiving system, is formed on the surface of a light receiving element, a certain flicker of the image occurs due to the eccentricity of the light beam. This system has a disadvantage that focusing cannot be done satisfactorily unless the object is of a substantial size.

These disadvantages of the prior art may be attributable to the fact that no common signal for distance measurement is present in any object to which focusing is to be effected. Such disadvantages may be avoided by projecting a light beam from the focusing device toward an object being photographed so that the projected light beam is reflected thereby and returns to the focusing device, whereby the reflected light beam from the object are detected for focusing.

U.S. Pat. No. 3,652,160 deals with this problem by projecting a spot of light on an object to be brought into focus, making the operation independent of picture contrast, but this system works only on the breadth of a single steady spot and hence is directionally ambiguous and requires external memory as to whether the desired adjustment is being approached from the near or distant side.

SUMMARY OF THE INVENTION

It is an object of the present invention to eliminate all the foregoing disadvantages existing in the conventional photographic cameras provided with an automatic focusing device, and to provide a photographic camera equipped with a radiation source emitting a pair of radiant rays, such as light rays for the detection of an object being photographed and with a device employing a system for automatically carrying out focusing by utilizing the rays reflected at the object at spots more or less in registry illuminated by the respective radiant rays.

It is another object of the present invention to provide an automatic focusing device for use with photographic cameras employing a system, in which two light beams projected from a luminous source fixed to the optical system of a photographic camera or the like are reflected by an object being photographed and directed to a light receiving system juxtaposed with the luminous source means so that an image of the point of its interception of the projected light beams may be formed on the light receiving system, thereby optically and photoelectrically detecting the position of the object in accordance with the condition of the formed image to accomplish distance measurement.

It is still another object of the present invention to provide an automatic focusing device for use with photographic cameras having an arrangement in which at least a portion of the optical means in a light receiving system for receiving a radiant ray, which is emitted from a radiation source and reflected by an object, is operatively associated with the optical means in a picture-taking system and in which the outputs of photoelectric converter elements such as light receiving elements disposed in the light receiving system control a drive means for adjusting the picture-taking system to the best focused position.

It is yet another object of the present invention to provide an automatic focusing device of the above-described type in which two time-shared radiant rays whose convergence is variable in connection with the focal position of the picture-taking system are projected to an object being photographed so as to detect a coincidence between two images formed in the light receiving system by two radiant rays reflected from the same object, thereby detecting the focal position of the picture-taking system.

It is another object of the present invention to provide an automatic focusing device of the described type in which a chopper having open sections and closed sections at a length or angle ratio equal or approximate to 1:3 is used for projecting the time-shared radiant rays from a continuous radiation source.

It is a further object of the present invention to provide an automatic focusing device of the described type in which synchronized signals for controlling the device can be derived from the paths of the radiant rays projected from the radiation source.

It is yet a further object of the present invention to provide an automatic focusing device whose automatic focusing system can be assembled as one unit to the body of a photographic camera with mechanical and electrical connections simultaneously established therebetween.

Other objects and features of the present invention will become fully apparent from the following detailed description of various embodiments thereof taken in conjunction with the accompanying drawings.

BRIEF DESCRIPTION OF THE DRAWINGS

FIG. 2(A) is a diagram of another photoelectric signal detection circuit usable with the device of the present invention.

FIGS. 2(B) and 2(C) show light receiving elements used in the circuit of FIG. 2(A) and provided with a light proof mask or a filter.

FIGS. 2(D), (E) and (F) illustrate the waveforms of the output signals of the light receiving elements shown in FIGS. 2(B) and 2(C), with time represented as the abscissa.

FIG. 3 is a plan view showing an example of a radiant ray modulator for a radiation source usable with the device of the present invention.

FIG. 4, located on the same sheet as FIG. 1 schematically illustrates an example of the optical system for the radiation source usable with the device of the present invention.

DESCRIPTION OF THE PREFERRED EMBODIMENTS

The principle underlying the device of the present invention will first be described with reference to FIGS. 1(A) to 5.

Figure 1A:
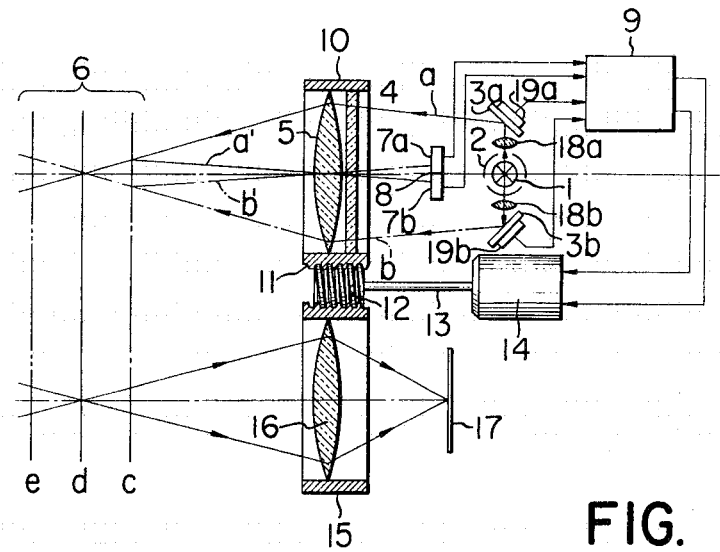
FIG. 1(A) is a diagram illustrating the principle of the present invention.

In FIG. 1(A) numeral 1 designates a light source for creating a luminous target on an object to which focusing is to be effected. The light source 1 may be any known energy source of high efficiency and considerable intensity such as miniature tungsten lamp, Xenon lamp, laser device, luminous diode or the like. Disposed around the light sources 1 is a chopper 2 adapted to project a light beam from the light source 1 in discrete directions and also acting as a light beam modulator. The chopper 2 has its openings disposed so that light beams may be projected alternately in two directions.

Two light beams $a$ and $b$ thus projected are reflected by half-silvered mirrors $3a$ and $3b$, respectively positioned symmetrically with respect to the light source 1, and then pass through a filter 2 for restricting the light beams to a desired wavelength range and further through an optical system 5 to an object 6. The light beams $a'$ and $b'$ reflected by the object 6 again pass through the optical system 5 so as to be focused on light receiving elements $7a$ and $7b$.

If the object 6 lies at a position as indicated by a single-dot broken line $c$, the images formed by the reflected light beams $a'$ and $b'$ will be focused on the light receiving elements $7b$ and $7a$, respectively. Conversely, if the object 6 is located at a position as indicated by a double-dot broken line $e$, the images formed by the reflected light beams $a'$ and $b'$ will be focused on the light receiving elements $7a$ and $7b$, respectively. When the position of the object 6 is coincident with a solid-line position $d$, i.e., the merging point of the two light beams $a$ and $b$, the two images of these light beams will be focused in registered relationship at the center portion 8 between the light receiving elements $7a$ and $7b$. Outputs generated by the images focused on the respective light receiving elements $7a$ and $7b$ are led to signal detection circuits as shown in FIG. 2(A) which are included in an electric circuit 9.

Figure 1B:
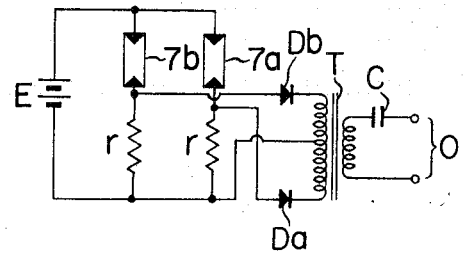
FIG. 1(B) is a circuit diagram of a type of detection circuit usable in the device of the present invention.

The circuit of FIG. 1(B) includes the aforesaid light receiving elements 7a and 7b, parallel resistors r of equal resistance value forming a bridge circuit, a bias voltage source E, diodes Da and Db, a transformer T and a capacitor C for removing a predetermined level of noise. Signals of the same sign produced by the light receiving elements 7a and 7b upon alternate impingements of two light beams thereon are converted into signals of different signs through the diodes and transformer. Since the two signals are caused to appear alternately by the chopper 2 of FIG. 1, they are directed as an A.C. signal to output terminals 0. When the object 6 is located at the position c or e in FIG. 1, a push-pull A.C. signal is produced at terminal O (with a 180° phase difference between the two cases), but when the object is at the position of d, the two signals negate each other in both halves of the cycle to provide a zero output, as can be clearly gathered from FIG. 1(B). In other words, the object located at a position before or behind the focal point of the optical system results in the production of A.C. signals, the phase of which will readily indicate (180° difference) which of these two cases is present, and only the object properly located at the focal point of the optical system results in a zero output.

In the electric circuit 9 the output of the circuit shown in FIG. 1(B) is subjected to amplification, phase discrimination, etc., whereafter it is applied to a servomotor 14 which is mechanically connected to a rack 11 via a gear 12 in mesh therewith and a connector rod 13. The servomotor 14 may be rotated in normal or reverse directions or stopped rotating in accordance with the output from the electric circuit 9, thereby moving the optical system 5 forwardly or backwardly or stopping the same. It will be apparent that the arrangement described so far always ensures the optical system 5 to automatically position the merging point of the two light beams on the object 6. When the apparatus is far away from the desired focus so that the two spots respectively illuminated by rays a and b are quite distinctly apart, the fact that optical system 5 is out of focus does not seriously interfere with the operation of circuit 9 because the separation of the spots reduces the overlap that would otherwise occur from de-focusing. As the two spots draw closer in response to the automatic adjustment of the apparatus, the optical system 5 at the same time approaches a focused condition, improving the resolution of the images on light receiving elements 7a and 7b so that the approach of these two images to the boundary between elements 7a and 7b will not disturb the measurement. This clarification of the images at the merging point of the two light beams a and b approaches the surface of the object greatly enhances the accuracy of distance measurement.

Figure 1C:
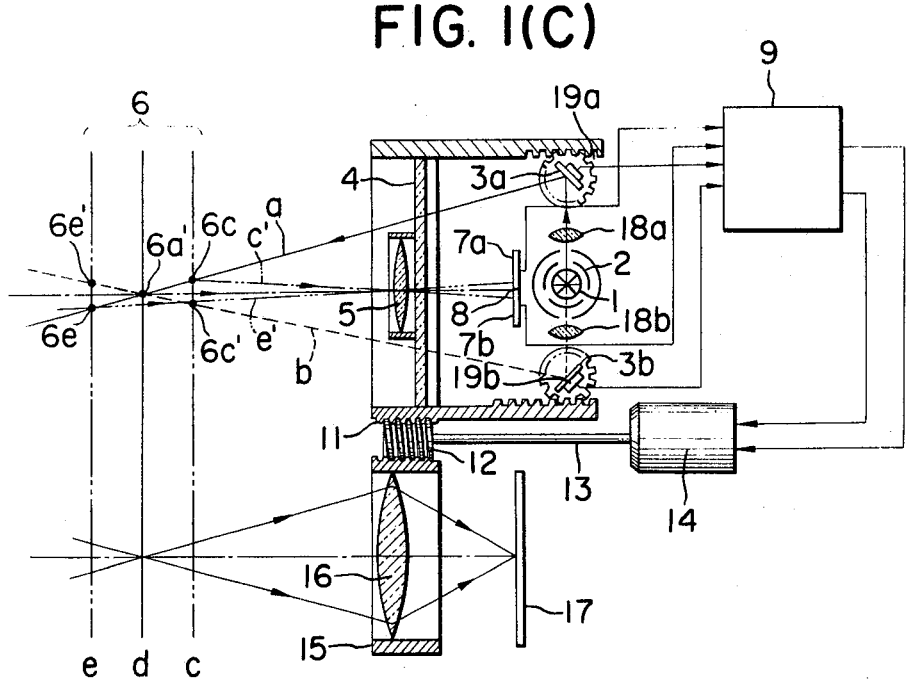
FIG. 1(C) is a diagram further illustrating the principle of the invention.

FIG. 1(C) is a modification of FIG. 1(A), the explanatory diagram already discussed, in which the mirrors 3a and 3b are rotatable and have their position controlled at a focusing movement driven by the worm 12. The pivoting of the mirrors 3a and 3b is made to be such that the projected ray respectively reflected by them converge in an object plane in which objects produce images in focus on the film 17. Since the variable convergence of the alternately projected rays a and b is in this case taken care of by the pivoting of mirrors 3a and 3b, these rays pass through openings outside the periphery of the lens 5, although they do pass through the filter 4. The lens 5, however, focuses an image of the central part of the object on the light sensitive elements 7a and 7b.

In FIG. 1(C), instead of showing rays reflected from both spots of light on the object when it lies in plane c, there are shown the rays reflected from the spot of light produced by the ray a for the two cases where the object is in the plane c and when the object is in the plane e respectively. To avoid confusion, no attempt is made on FIG. 1(C) to show rays reflected from the spots of light produced in these two cases by the ray b, which is assumed not to be present in the instant depicted by the diagram and, therefore, is shown only in dashed lines. Assuming, then, that at the particular moment the ray a is being projected, if the object is in the plane c represented by a double-dotted broken line, the center of the reflected rays gathered by the lens 5 by the light spot at the point 6c is indicated by the ray c', appropriately shown by a double-dotted broken line. If, now, the object were instead in the plane 6e, represented by the triple-dotted broken line in FIG. 1(C), the central reflected ray from the light spot at the point 6e is the ray e', appropriately indicated by a triple-dotted broken line.

As is particularly shown in FIG. 1(C), when the object is in front of the plane for which the camera is focused, the image of the light spot produced by the ray a formed on the light sensitive element 7b, whereas if the object is located farther away than the distance for which the image formed by the lens 5 of the light spot produced by the ray a is focused on the light sensitive element 7a. The opposite is true for the light spots produced by the ray b, as shown in FIG. 1(A) by the rays a' and b' for the case in which the object is nearer to the camera than the object distance for which the camera is focused.

As shown in FIGS. 1(A) and 1(C), the optical system 5 is moved simultaneously with the lens tube 15 carrying the picture-taking objective 16 therein by means of the worm gear 12 acting on both optical systems. The reference characters 18a and 18b denote collimating lenses to focus the light from the source 1 into a narrow parallel beam. The arrangement of FIG. 1(A) of the lenses 18a and 18b may also be regarded as compensating the difference in length of the physical path of the lens 5 of the sensitive elements 7a and 7b, on one hand, and the light source 1 on the other hand.

19a and 19b designate photoelectric elements for producing synchronized signals used for phase discrimination and supplying such signals to the electric circuit 9, which will be described later in detail. Each of the light receiving elements 7a and 7b used in the arrangements of FIGS. 1(A), 1(B) and 1(C) may be a single light receiving element such as a cadmium sulfide ($CdS$) element.

FIG. 2(A) shows a simpler form of detector using a single light sensitive element 7'. This circuit is for use with a special type of mask or filter designed to provide a directional sensitivity so that a suitable form of the circuit 9 will be able to recognize whether the object is closer or more distant than the distance for which the camera is focused, as a substitute for the arrangement already described with two light sensitive elements in the circuit of FIG. 1(B).

FIG. 2(B) shows a light receiving element provided with a light-proof mask having an opening whose cross section gradually varies in the direction in which the images of the two light beams a', b' shown in FIG. 1 are disposed. FIG. 2(C) shows a light receiving element provided with a filter whose transmittivity to light beams varies gradually in the same direction. By preparing such a masked or filtered element as shown, and by locating it in such a manner that the side thereof which has a greater transmittivity, i.e., a greater opening dimension, lies at a position where the image of reflected light beam from a remote object is focused, it is possible to substantially prevent the output of the light receiving element from being reduced with the reduction in energy of the reflected light from an object at a long distance while any excessive input may be prevented because the opening dimension corresponding to the focused position of the image formed by the reflected light from an object at a short distance is small, and this results in a favorable effect that a kind of automatic input adjustment is achieved.

When used with the present device, these light receiving elements will provide such outputs as shown in FIGS. 2(D), 2(E) and 2(E). As seen, these are alternating outputs corresponding in period to the projected light beams. For an object lying at the position $e$ or $c$ of FIG. 1, there is produced an output whose amplitude alternately varies as shown in FIG. 2(E). When a detector of the type shown in FIG 2(A) is used, the circuit 9 must actuate the motor 14 so as to bring the signal through the form shown in FIG. 2(E) and it can utilize the phase difference between the waves of FIG. 2(D) and of FIG. 2(F) to determine the direction in which the motor 14 should be driven, just as in the case of the detector of FIG. 1(B) the phase of the alternating current produced by an off-focus condition is used to drive the motor 14 until the detector output is zero, as already mentioned above and described in more detail below.

FIG. 3 shows a plan view of the chopper 2 usable with the present device. The chopper most preferably used with the present device is such that one of two light beams is completely intercepted while the other begins to be projected and this should take place alternately between the two light beams. The size of the openings in the chopper preferably made so that the ratio of open-to-closed areas is 1:3 as shown in FIG. 3. The choice of the particular ratio depends on the degree of concentration of the light source 1.

FIG. 4, which appears on the same sheet as FIG. 3 illustrates the construction of the optical system for the radiation source which may be used as the light source in FIG. 1. This consists of an energy source B, such as miniature tungsten lamp, discharge tube, laser device and luminous diode, a spherical surface mirror S, a parabolic surface mirror P disposed circumferentially of the spherical surface mirror S, and an optical path compensation system OC such as Schmidt plate or the like. The illustrated construction of the radiation source means enables the drive energy of the radiation source to be reduced and facilitates to control the emission from the light source.

Figure 5:
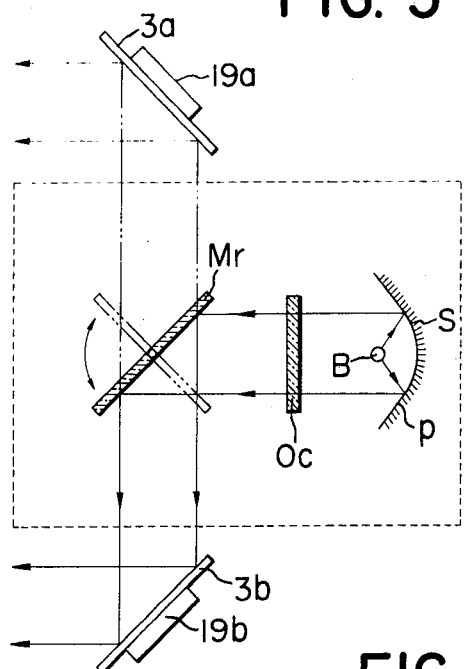
FIG. 5, on the same sheet as FIG. 10, illustrates an embodiment in which the optical system of FIG. 4 is applied to the construction of FIG. 1.
Figure 12:
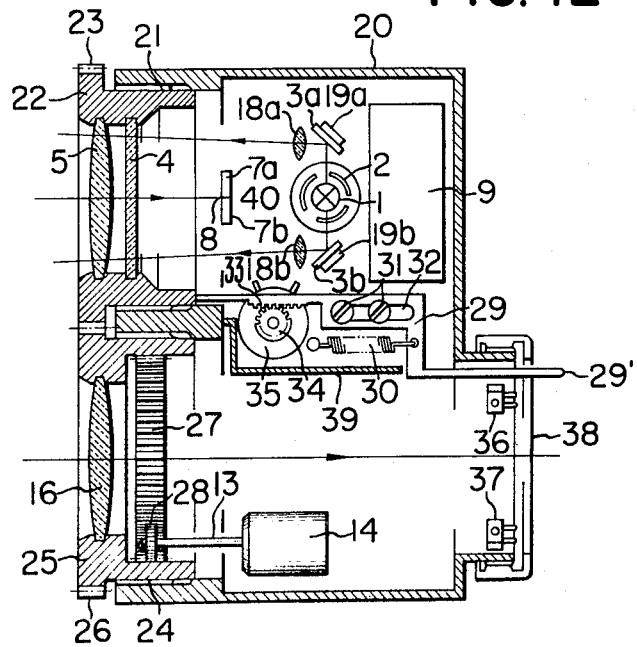
FIG. 12 is a cross-sectional view showing another embodiment of the device in accordance with the present invention, especially its construction as an automatic focusing unit.

FIG. 5, on the same sheet as FIG. 12, shows a specific embodiment in which the radiation source of FIG. 4 is applied to the automatic focusing device of FIG. 1. Those elements which can be replaced by the light source 1, chopper 2 and correction lenses 18a, 18b of FIG. 1 are shown within dotted lines. The radiant rays emitted from the discharge tube B and reflected by the spherical mirror S and parabolic mirror P pass through the optical path compensation system OC, whereafter the path of such radiant rays is divided by a total reflection mirror Mr rotated or pivoted at a predetermined time interval synchronously with the discharging of the discharge tube, in the same way as done by the aforesaid chopper. Thereafter, the radiant rays act just in the same way as described with respect to FIg. 1.

Figure 6:
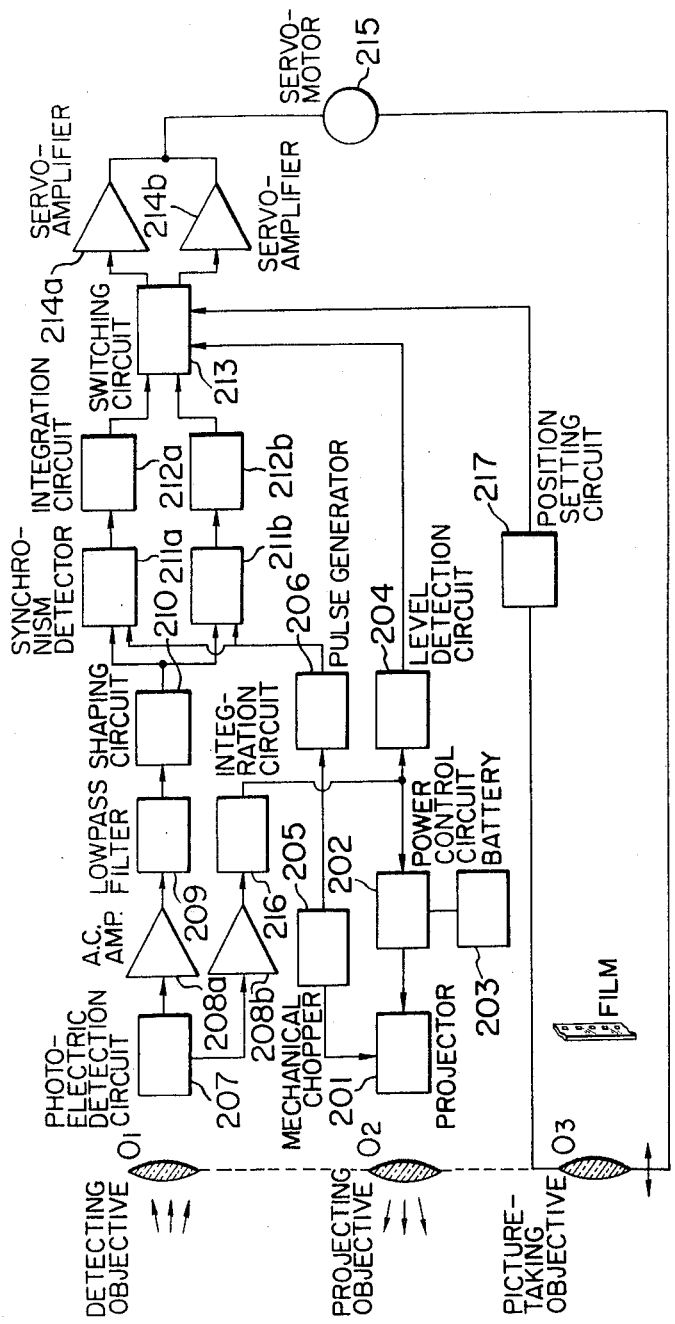
FIG. 6 is a block diagram showing an example of the electric circuit which can be incorporated in the device of the present invention.

FIG. 6 is a block diagram chiefly showing an example of the electric circuit usable with the device of the present invention, in which two light receiving or photoelectric elements are employed. Two light beams projected from a projector 201 including a light source are alternately interrupted by mechanical chopper 205 and at the same time they undertake an amplitude modulation by the frequency determined by the time interval of interruption and then they come to be projected through an optical system $O_2$ having a projecting objective, which may provide a separate lens for each beam.

The reflected light beams from an object pass through an optical system $O_1$ having a detecting objective to the light receiving elements 7a, 7b, and are converted into electrical signals through a photoelectric detection circuit 207 as shown in FIG. 2 (A), and then applied to an A.C. amplifier 208a. It will be apparent that the output of the A.C. amplifier 208a is a signal having a phase and amplitude corresponding to the positional relationship between the object and the merging point of the projected two light beams. The output of the A.C. amplifier 208a is passed through a low-pass filter 209, which removes periodical noises, especially noises as of 100 or 120 Hz resulting from the commercial A.C. source, whereafter the output enters a shaping circuit 210. The output signal is thereafter divided into two signals, one of which is reversed in phase, and the two signals enter synchronism detectors 211a, 211b, which detect the synchronism between the two signals by using synchronized signals from a pulse generator 206 constituted by pulse generating photoelectric elements 19a, and 19b. The output of the synchronism detectors 211a, 211b is supplied to only one of the two integration circuits 211a and 212b in accordance with the sign of the output signal, whereafter it is passed through a switching circuit 213 and a servoamplifier 214a or 214b so as to drive a servomotor 215 in a direction corresponding to the sign of the output. As the servomotor 215 is so rotated, the optical systmes $O_1$, $O_2$ and the picture-taking objective $O_3$ are moved forwardly or backwardly to vary the focused condition of the images on the light receiving elements 7a, 7b so that the entire system shifts in the direction for bringing the two images on the light receiving elements into registration, i.e., in the direction for bringing the two light beams into a proper position on the object. In this way, the position of the object can be detected automatically and accurately and accurate focusing on the film surface can be ensured always by the operative association of the picture-taking objective $O_3$.

On the other hand, in order to control the input power to the projector 201 in accordance with the distance to the object and maintain the input to the light receiving elements at a predetermined level, one of the outputs of these elements is introduced into the amplifier 208b, which in turn is guided to an integration circuit 216, the output of which is guided to a power control circuit 202 interposed between power source 203 and projector 201, whereby the output of the projector 201 can be controlled. This is very useful to reduce the possible error in distance measurement resulting from the different characteristics of the photoelectric elements, and accordingly enhance the accuracy of the device. Further, for example, when an object located at the range of infinity is aimed at or when the energy of the reflected light from an object is of very low intensity for some reasons or other, the output from the integration circuit 216 is directed to a level detection circuit 204 to quickly move the optical system to a position for infinity or to an over-focal length position, and if the signal is lower than a predetermined level, the switching circuit 213 will be caused to operate so as to change over the circuit connection to a position setting circuit 217 which is separate and different from the normal signal system. The position setting circuit 217 comprises a bridge or like circuit which compares the signal corresponding to the from-time-to-time position of the picture-taking objective with a predetermined signal corresponding to the infinity or over-focal length position of the picture-taking objective. The position setting circuit 217, until balanced, causes the amplifier 214a or 214b to rotate the servomotor 215 in a direction corresponding to the sign of its output, thereby moving the optical system. When the output from the amplifier 208b exceeds a predetermined value, it is apparent that the switching circuit 213 quickly restores in situ through a similar operation to return the system to its normal mode of operation.

Figure 7:
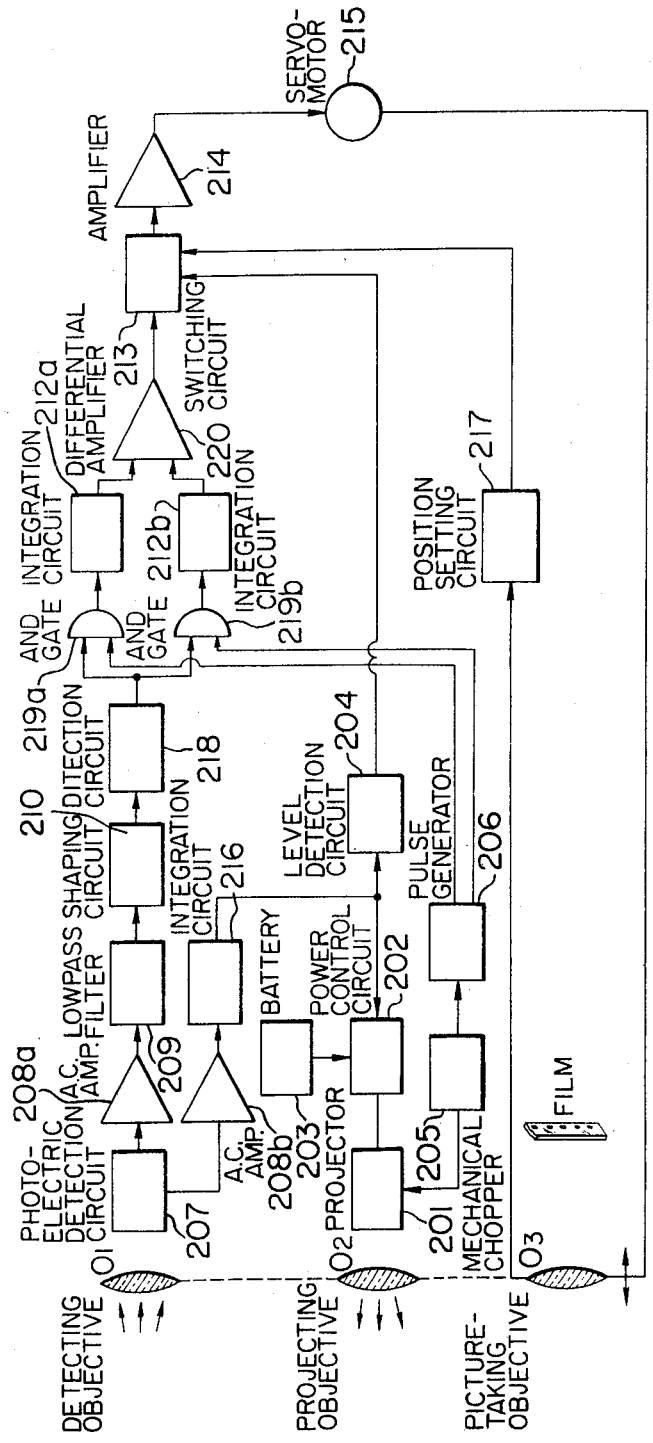
FIG. 7 is a block diagram showing another example of the electric circuit which can be incorporated in the device of the present invention.

FIG. 7 shows another example of the circuit arrangement which uses a single light receiving element. This circuit arrangement differs from that of FIG. 6 in that a detection circuit 218 is connected with the output of shaping circuit 210 for removing any unnecessary component of the output signal and this signal, together with synchronized signals from pulse generator 206 corresponding to the respective light beams, is directed to AND gates 219a, 219b to a differential amplifier 220. The output of the differential amplifier 220 is evidently a signal having a sign and amplitude corresponding to the positional relationship between the object and the merging point of the two projected beams. This output is passed through switching circuit 213 to amplifier for further amplification, so as to rotate the servomotor in a direction corresponding to the sign of the output.

Description will now be made of various embodiments in which focusing may be effected by the abovedescribed system.

Figure 8:
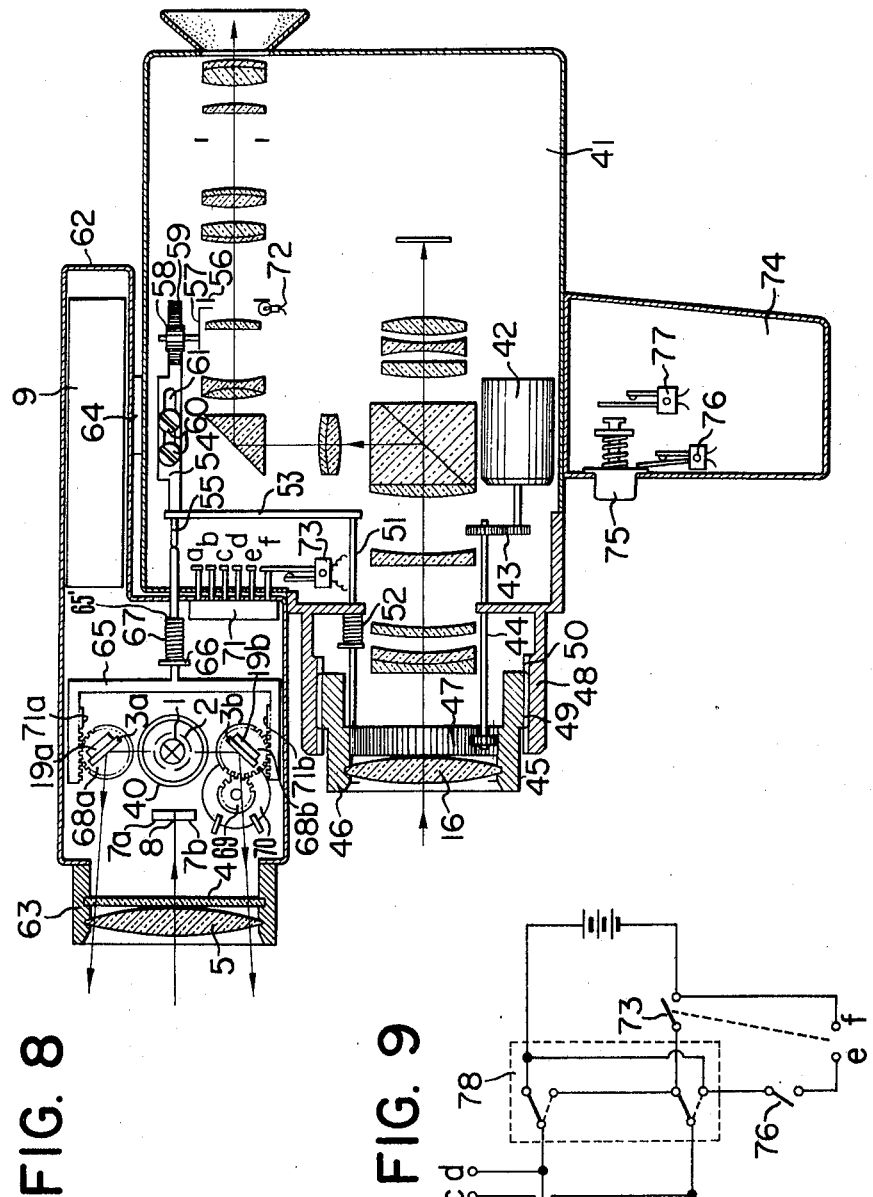
FIG. 8 is a cross-sectional view showing one embodiment of the device in accordance with the present invention, especially its construction when combined with an electric focusing type camera.

FIG. 8 shows an embodiment wherein the device of the present invention is combined with the so-called "electric focusing type camera" whose focusing system is axially moved for adjustment of the focal point by an electric motor. It will be appreciated that the automatic focusing system utilized in this embodiment can be of any type including that of the present invention.

In the figure, the elements indicated by 1, 2, 3a, 3b, 4, 5, 7a, 7b, 8, 9, 16 19a and 40 are similar in function to those shown in FIG. 1, and these elements together constitute the major portion of the automatic focusing device according to the present invention. Photographic camera body 41 contains therein a focusing motor 42 whose rotation is transmitted through gear train 43, transmission shaft 44 and pinion 45 to an interval gear 47 provided within lens tube 46 for holding the picture-taking objective 16 therein. The lens tube 46 has a helicoid 49 and is engaged with a helicoid 50 formed in the inner wall of a holding member 48 so that the lens tube can be rotated and axially moved with the rotation of the focusing motor 42. A member 51 is normally biased into contact with the lens tube 46 by a spring 52 secured to a portion of the holding member 48. The member 51 is rigidly connected to separate members 53, 54 and pin 55. At one end of the member 54 is formed a rack 59 which is in mesh with a pinion 58 having a needle 57 for providing distance information within a viewfinder frame 56. The intermediate portion of the member 54 is formed with an elongated slot 61 for receiving guide members 60 to move the member 54. The members 51, 53 and 54 and pin 55 can follow the axial movement of the lens tube 46 to thereby provide, within the viewfinder, distance information representing the distance at which the picture-taking system is focused. Thus, whenever an object is photographed, it is possible to know the distance at which the camera is focused and to make sure whether the later-described automatic focusing unit is in proper operation. A casing 62 for housing the automatic focusing unit is formed integrally with a lens tube 63 holding the filter 4 and optical system 5, and it is connected to the camera body by means of a shoe 64. A member 65 having a stepped portion 65' is biased rightwardly, as viewed in FIG. 9, by a spring 67 provided between the stepped portion 65' and a member 66 fixedly provided at a casing so that it is normally in abutment with the pin 55 so as to follow the axial movement of this pin. The member 65 is formed with racks 71a and 71b which are engaged with gears 68a and 68b rotatably holding half-mirrors 3a, 3b for varying the directions of the projected light beams in the automatic focusing system. Thus, the axial movement of the picture-taking system 16 and the rotation of the half-mirrors in the automatic focusing system are associated together, whereby the merging point of the two projected light beam can be set to a distance at which the picture-taking system 16 is properly focused. The gear 68b is in mesh with a pinion 69 securely mounted on the shaft of variable resistor 70. The resistance value of variable resistor 70 provides a signal representing the position of the picture-taking system in the position setting circuit 217 at any point of time. On the inner wall of the casing 62 at the portion which is in contact with the camera body 41, there is provided a connector 71 which electrically connects the camera and the automatic focusing system. More particularly, contacts $a$ and $b$ are connected to an alarm device 72 for providing warning against impossibility of distance measurement, contacts $c$ and $d$ provide output terminals of the automatic focusing device and are connected to a motor 42, and contacts $e$, and $f$ provide a main switch through which a power source provided within the camera for driving the motor 42 may also be utilized as the power source for driving the automatic focusing system, the contact $f$ being common with one of the contacts of a switch 73. The switch 73, adapted to open upon assemblage of the automatic focusing unit to the camera body, is serially inserted in the electric focusing circuit in order to change over this circuit to an automatic focusing circuit upon assemblage of the automatic focusing unit to the camera body. A grip 74 has a release button 75 of the two-step action type mounted therein, whose first step action closes a switch 76 to operate the automatic focusing system and then at the second step action opens a switch 77 to effect a shutter release.

Figure 9:
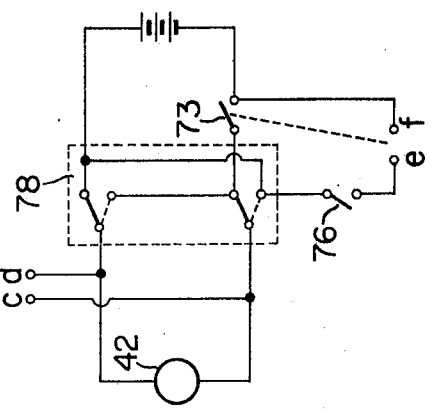
FIG. 9 is a diagram of an electric circuit usable in the embodiment shown in FIG. 8 and showing the electrical connection between the automatic focusing system and a photographic camera body.

FIG. 9 shows the electrical connection between the above-described automatic focusing system and the camera body. In this figure, contacts *a* and *b* are omitted. Numeral 78 denotes a switch for electric focusing, and numerals 42 and 73, 76 correspond to the servomotor and switches shown in FIG. 8.

Figure 10:
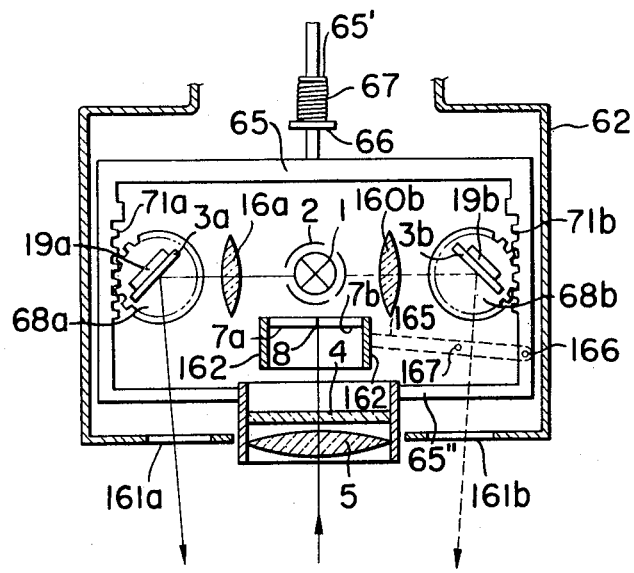
FIG. 10 is a cross-sectional view of a modification of the embodiment of FIG. 8 of the device in accordance with the present invention.

FIG. 10 shows a modification of the kind of automatic focusing device shown in FIG. B in which pivoted mirrors 3a and 3b determine the range at which the two spots of light alternately projected on an object come into registry. In FIG. 8 the optical system comprising the lens 5 was fixed rather than movable, which is practical enough where the system is not required to work for extreme close-up conditions.

Figure 13:
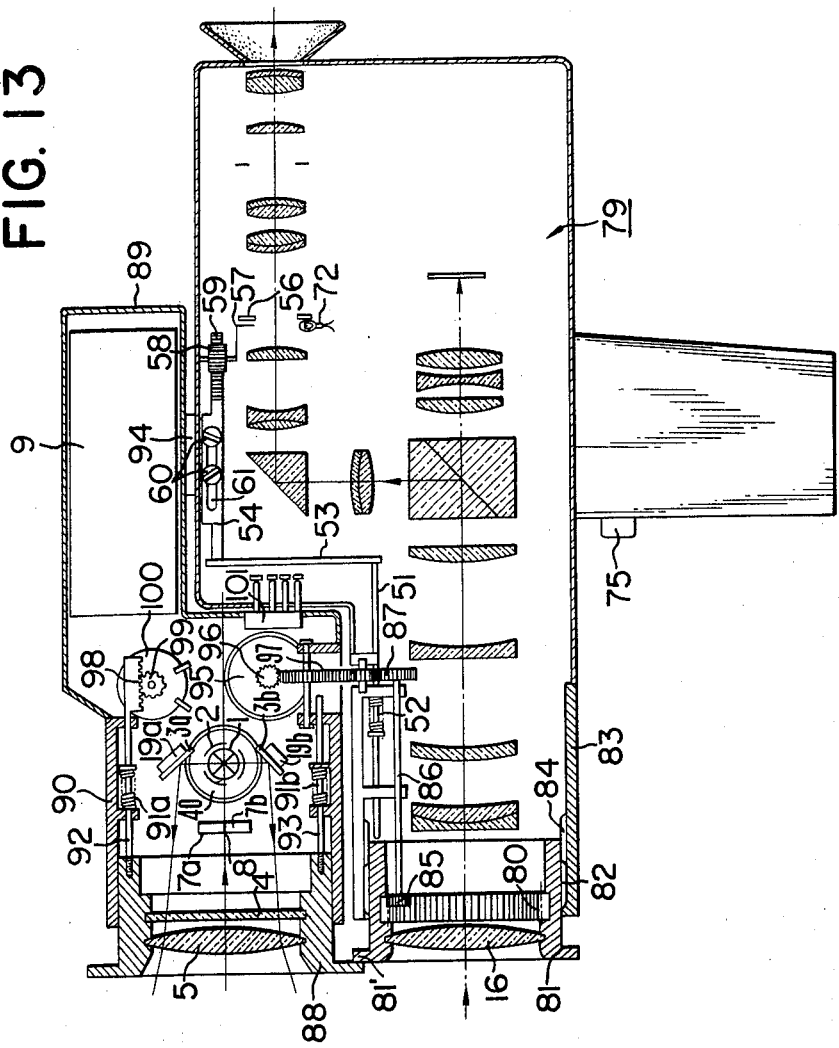
FIG. 13 is a cross-sectional view showing the essential portion of still another embodiment of the device in accordance with the present invention, especially its construction when combined as an automatic focusing unit with a photographic camera body.

In FIG. 10 the focusing of the projected light is accomplished by the lenses 160a and 160b located between the light source 1 and the mirrors 3a and 3b, respectively. It is then not necessary for the radiant rays projected forward by the mirrors 3a and 3b to pass through the lens 5. They pass instead through the slots 161a and 161b in the front of the casing 62 of the automatic focusing attachment. This permits the use of a base line between the centers of the mirrors 3a and 3b much wider than the diameter of the lens 5, making the degree of registry of the two light spots more sensitive to differences in distance from the camera. In order to provide a wider base line more conveniently, the mirrors 3a and 3b in FIG. 13 are horizontally arrayed, rather than vertically as shown in FIG. 9.

A light shield 162 is provided to mitigate the incidence of stray light from the projection system onto the light sensitive elements 7a and 7b.

In FIG. 10 the potentiometer 70 and its drive gear 69 shown in FIG. 9 are omitted, in order to simplify the illustration.

Although the lens 5 in FIG. 10 could be in fixed position with respect to the casing 62, as in FIG. 8, the member 65 in FIG. 10 has an extension 65'' for adjusting the focus of the lens 5 with respect to the light sensitive elements 7a and 7b in order to realize the additional precision of distance resolution described in connection with the focusing of the lens 5 in FIG. 1. The diameter of the gears 68a and 68b is to be chosen so as to establish the necessary correlation between the registry of the spots formed by the projection of the intermittent light beams with the focusing of the photographic objective and of the lens 5. The departure of this correlation from linearity is not important to the lens 5, but it may be desirable to take account of this in connection with the focusing of the photographic objective (16 in FIG. 9), which may be done by progressively varying the radius of the toothed portion of gear wheels 68a and 68b and providing the racks 71a and 71b with a mating departure from linearity. A much simpler method of providing a non-linear relation between the movement of the lens 16 and the rotation of the mirrors 3a and 3b is to provide a camming surface on that part of the lens barrel 35 on which the member 51 FIG. 8 bears, so that the displacement of the member 51 is not merely the axial displacement of the lens barrel 45, but that as modified by a correction provided by the design of the cam surface (47a, FIG. 8), which takes effect as the lens barrel is caused to rotate in its screw mount 48.

The focusing of the spot images on the light sensitive elements 7a and 7b may be accomplished by moving the light sensitive elements instead of the lens 5, which is then fixed. In that case the member 65'' is omitted and, instead a link member 165 pivoted on movable pin 166 and fixed pin 167 is used. Preferably, a second link member (not shown) is also used on the other side of the structure to provide a balanced force and the detector 8 is mounted slidably in a guide (not shown).

Figure 11:
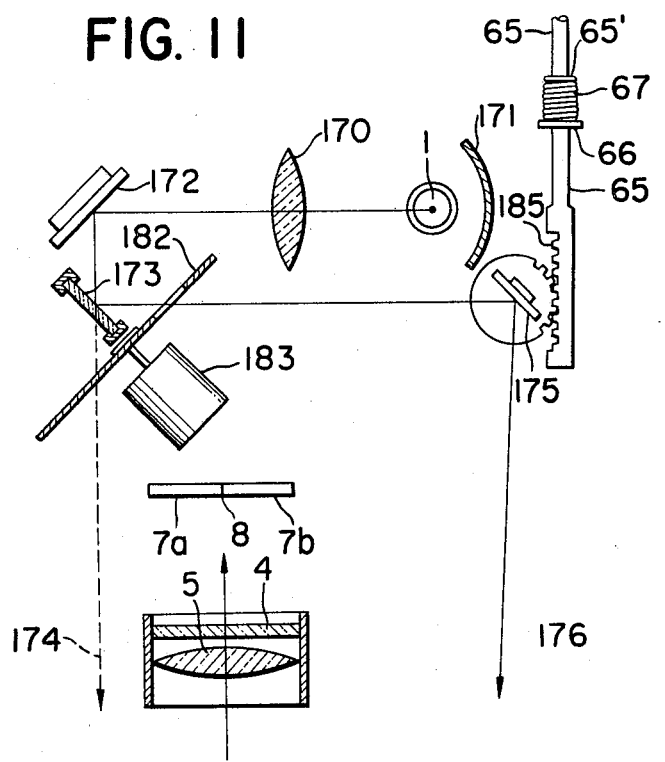
FIG. 11 is a still further modification of the embodiment shown in FIG. 8.

FIG. 11 shows a modification of the arrangement of FIG. 10 in which only one pivoted mirror 165 is used instead of the pair of mirrors 3a and 3b and in which only one lens 170 is used instead of the two lenses 160a and 160b. In this case a reflector 171 (which could be integrated into the light source 1 in sealed beam fashion, instead of a separate reflector as shown in FIG. 11) is used along with the lens 170 to form a narrow beam of light. In order that the optical system consisting of light source 1, the lens 170 and the reflector 171 may be disposed compactly, it is arranged parallel to the base line of the system and the fixed mirror 172 is provided to fold the light path. The light beam, as redirected by the fixed mirror 172 is then split by the half silvered mirror 173, so that half the light proceeds straight on as shown by the arrow 174 and half goes first to the pivoted mirror 175, from which it is adjustably deflected in a direction indicated by the arrow 176 so that both rays will be in registry when they impinge on an object at a particular distance determined by the angular position of mirror 175. A shutter 182 alternately blocks each ray while allowing the other to pass. This shutter may conveniently be formed of an aperatured disc rotated by a motor 183.

Since the intersection of the path of the two rays respectively indicated by the arrows 174 and 178 necessarily lies along the fixed path 174, in this form of the automatic focusing device there may be a parallax error at the detector 8, since the detector 8 must be offset from the path 174. This error is of course small if the offset is small as compared to the shortest focus distance of the photographic objective for which the automatic focusing system is to be operable. Consequently this error can usually be neglected, but if it should be important in a particular case, the detector 8 could be moved slightly transversely at the same time that the mirror 175 is rotated (by means not shown) so that the image of the point of registry of the rays 174 and 176 will remain in the center of the detector 8. In this form of construction the position of the lens 5 is preferably fixed, as in the case of FIG. 8, although it could be given an axial displacement in the manner shown in FIG. 10.

It is to be understood that the mirrors 172 and 175 of FIG. 11 as well as the mirrors 3a and 3b of FIG. 10 may be of the prism type (such as 110 and 110' of FIG. 14, described below) and that instead of the half silvered mirror 173 a light splitting prism 111 (likewise shown in FIG. 14) may be used.

FIG. 12 shows an embodiment in which the device of the present invention assembled to the picture-taking objective 16 is used as an automatic focusing unit which can be combined with a photographic camera body by means of a mount. In this figure, the parts, light source 1, chopper 2, halfmirrors 3a and 3b, filter 4, optical system 5, light receiving elements 7a and 7b, center portion 8, electric circuit 9, connector rod 13, servomotor 14, picture-taking objective system 16, optical system 18a and 18b and photoelectric elements 19a and 19b are similar in function to those shown in FIGS. 1 and 8 and these parts together constitute the automatic focusing system of the present invention. For the purpose of FIG. 12 it is assumed that the movement of the lens 5 will provide the necessary variable convergence of the rays a and b projected by light source 1, mirrors 3a and 3b and auxiliary lenses 18a and 18b. It will be understood that arrangements such as shown in FIGS. 1 and 8 for rotating the mirrors could be used to provide the variable convergence in a unit mounted on the camera body as shown in FIG. 12.

The filter 4 and optical system 5 are installed within a lens tube 22 rotatable and axially movable by means of a helicoid 21 formed in a casing 20. The outer peripheral surface of the lens tube 22 is provided with a gear 23, which is in mesh with a gear 26 formed on the outer peripheral surface of a lens tube 25 which is also rotatable and axially movable by means of a helicoid 24 formed in the same casing 20. The lens tube 25 contains therein the picture-taking objective 16 and interval gear 27, and may be axially moved by the rotation of the servomotor 14 via a pinion 28 to thereby move both the picture-taking system 16 and the optical system 5 in the axial direction. Such timed movement of the two systems 16 and 5 may be accurately achieved by using the helicoids 24 and 21 of the same lead if the two systems are of the same focal length. In this event, however, the leads of the two helicoids 21 and 24 must be opposite in direction. A member 29 is provided and biased toward the lens tube 22 by a spring 30 so that one end of the member 29 is forced into contact with the corresponding end of the lens tube 22. In addition, the member 29 is adapted to follow any axial movement of the lens tube 22 with the aid of guide members 31 received in an elongated slot 32 formed in the member 29. Further, a portion of the member 29 is formed into a rack 33, which is in engagement with a pinion 34 connected to the shaft of a variable resistor 35. Thus, axial movement of the member 29 varies the resistance value of the variable resistor 35 and this causes generation of a signal representing the position of the optical system 5 and of the picture-taking system 16 in the manner described above. More specifically, in the compensation circuit forming the position setting circuit 217 described with respect to FIGS. 6 and 7, the variable resistor 35 can be a source of the signal representing the position of the picture-taking system 16 at any point of time. Further, although not shown, the right-hand end 29' of the member 29 is in connection with a range indicator mechanism provided in the camera body so as to enable the distance to the object to be known during photographing operation and to permit confirmation of the fact that the automatic focusing unit is in proper operation. A contact 36 is connected to an unshown alarm device such as a lamp provided in the camera body to warn the photographer when the object being photographed is not applicable to the present automatic focusing device. Another contact 37 is provided to close the main switch of the automatic focusing unit through a first-step operation of the unshown release button in the camera body, if the release button is of the two-set action type as shown in a later-described embodiment. The provision of such contact serves to ensure the automatic focusing unit to start its operation immediately before shooting and complete its operation immediately after shooting, thus obviating any malfunction and unnecessary operation of the unit. Numeral 38 denotes a mount for coupling the automatic focusing unit to the camera body, numeral 39 a light-proof plate for preventing leakage of light beams from the automatic focusing system into the picture-taking system 16, and numeral 40 a drive mechanism such as motor or the like for driving the chopper 2. The portion including the light source 1 and chopper 2 may be replaced by the radiant ray dividing mechanism including the radiation source and mirrors as described above with respect to FIG. 5.

In the present application wherein the integral assembly of an automatic focusing system and a picture-taking system is combined with a photographic camera body as by means of a mount, improvement of the camera body is very easy and the assembly can be regarded as one of accessories such as another picture-taking system, e.g., telephoto lens or the like, which would help the user to reduce a feeling of awkwardness in such device.

FIG. 13 shows an embodiment wherein the device of the present invention as automatic focusing unit is assembled to a photographic camera body. The parts designated by 1, 2, 3a, 3b, 4, 5, 7a, 7b, 8, 9, 16, 19a, 19b and 40 and 51, 52, 53, 54, 56, 57, 58, 59, 60, 61 and 72 are similar in function to those shown FIGS. 8 and 11, respectively, and these parts together constitute the major portion of the automatic focusing device according to the present invention. Camera body 79 has a focusing mechanism in which a lens tube 81 holding a picture-taking system 16 and having an interval gear 80 therein is formed with a helicoid 82 along the other edge thereof and engaged with a helicoid 84 formed in the inner wall of holding member 83 so that the lens tube can be rotated and axially moved, thereby achieving the focusing of the picture taking system 16. The body tube 81 has a flanged portion 81' formed at the outer top end thereof. The interval gear 80 is rotatable by an extraneous drive force imparted through a pinion 85 engaged therewith, a transmission shaft 86 and a gear train 87. On the other hand, the filter 4 and optical system 5 in the automatic focusing system is held within a lens tube 88 having a flanged portion at an extraneous outer top end and thereof, and the lens tube 88 is slidably fitted in the inner wall of a holding member 90 integral with a casing 89 for the automatic focusing unit and normally biased rightwardly by members 92, 93, which in turn are biased by spring 91a, 91b secured to portions of the holding member 90. It will thus be clearly seen that when the automatic focusing unit is coupled to the camera body 79 by means of a shoe 94, the optical system 5 can maintain a predetermined positional relationship with the picture-taking system 16 irrespective of the position of the latter system so that the merging point of the projected light beams may be cast at the position where the picture-taking system 16 is focused. In addition, the optical system 5 can exactly follow any axial movement of the picture-taking system 16. The output of the automatic focusing system is supplied to servomotor 95, and the rotational movement of which, in accordance with the output, is transmitted through worm wheel 96, gear train 87 and worm wheel 97 to axially move the picture-taking system 16. On the other hand, a member 92 has a rack 98 formed at one end thereof which rotates a pinion 99 and accordingly the shaft to variable resistor 100. Thus, in response to axial movement of the two systems 16 and 5, the shaft of the variable resistor 100 is rotated to vary the resistance value thereof. The resistance value of the variable resistor 100 may thus be a signal representing the position of the picture-taking system 16 in the position setting circuit at any point of time, as was already described in the previous examples. In the inner wall of the casing 89 at the portion which is in contact with the camera body 79, there is provided a connector 101 having contacts for making electrical connection between the camera body 79 and the automatic focusing unit. Again, these contacts are intended to transmit an alarm signal to alarm device 72 when distance measurement is impossible, and to cooperate with a switch adapted to close at the first step of the two-step action type release button 75 so as to energize and deenergize the automatic focusing unit.

From the foregoing it will be appreciated that the present embodiment is especially characterized in that the assemblage of the automatic focusing unit and the camera body can be accomplished simply by a single procedure and that the camera body need not be so much modified from its existing form. Also, the automatic focusing system in the present application can be used not only for the device of the present invention but also for any other type of focusing device.

Figure 14:
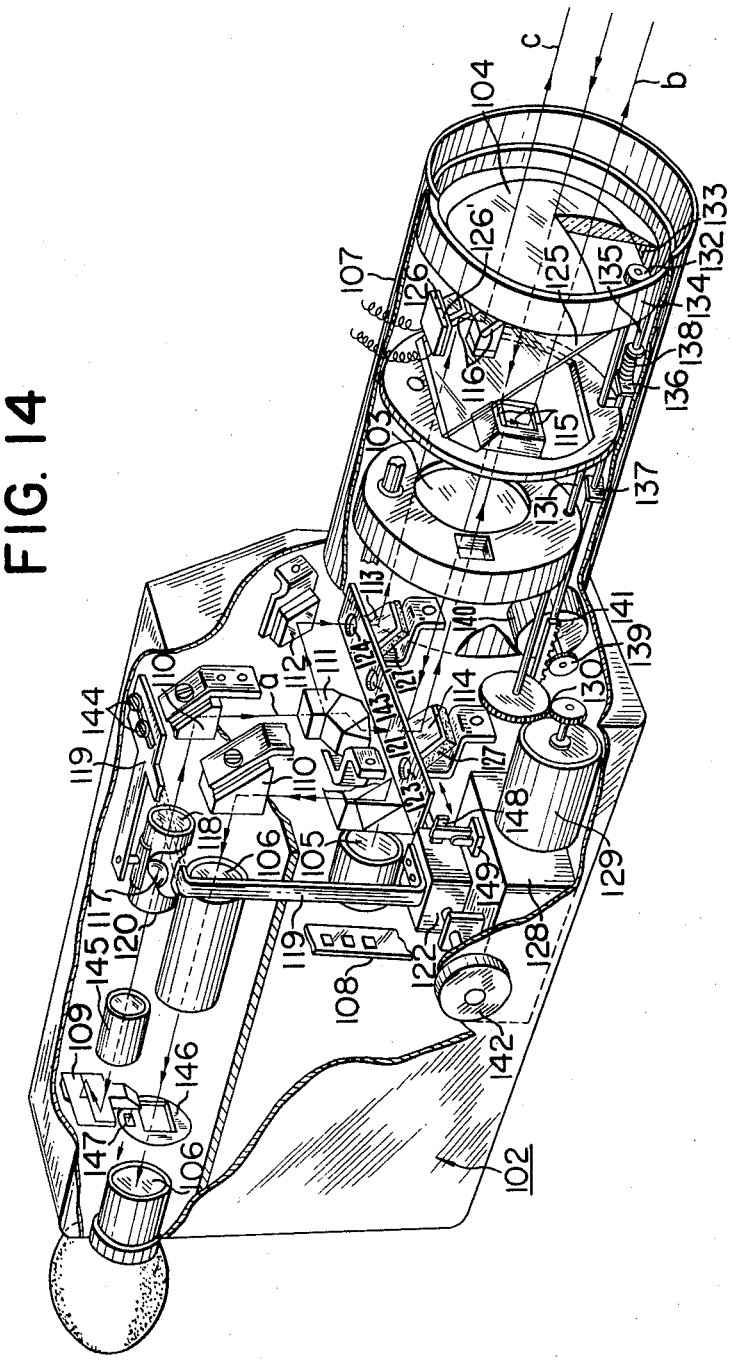
FIG. 14 is a perspective view showing a still another embodiment of the device in accordance with the present invention, especially its construction when incorporated in a photographic camera body.

FIG. 14 shows an embodiment wherein the device of the present invention is incorporated in a photographic camera body. The camera body 102 has a conventional optical system including a variable focal point optical system 103, a focusing optical system 104, an optical relay system 105 and a viewfinder system 106, the optical system being disposed partly within the camera body 102 and partly within a holding member 107. Separately from such conventional optical system, there is provided an optical system comprising prisms 109, 110, 110', 111, total reflection mirrors 112, 115, 116 and half-mirrors 113, 114. The prism 111 divides an optical path $a$, into two optical paths $b$ and $c$. In the optical path $a$, there is disposed a light source casing 120 which encloses a light source 117 and has a filter 118 provided at the forward end thereof for converting the light beam into a desired wavelength range, the light source casing 120 being suspended by a member 119 movably supported by means of guide members 144 so that the light projected from the light source 117 may pass through the said separate optical system in order to project two light beams $b$ and $c$ through the focusing optical system 104 toward the object being photographed. These two light beams may be alternately interrupted by a chopper 121 disposed in the optical paths and vibrated in a direction perpendicular to the two optical paths by a vibrator 122, and at the same time the two beams are modulated their amplitudes by a frequency determined by the time interval of the interruption. The chopper 121 is formed with small apertures 123 and 124 suitably located to alternately interrupt the two optical paths $b$ and $c$ by its vibration of a predetermined amplitude. Thus, the light beam from the light source 117 may be divided into two beams by the prism 111, and then alternately interrupted by the chopper 121 while being modulated their amplitudes by a predetermined frequency, whereafter the two light beams pass through the focusing optical system 104 to an object being photographed.

It is assumed for the purposes of FIG. 12 that the movement of the optical system 104 provides the necessary variable convergence of the rays $b$ and $c$. It is to be understood, however, that this variable convergence could be provided by rocking mirrors 113 and 114 about a vertical axis, further, that the rays $b$ and $c$ could be projected externally of the optical system 104 thus taking advantage of a wider base line.

Part of the light beams reflected by the object again passes through the focusing optical system 104 to a filter 125 disposed behind it. The filter 125 reflects only light in a wavelength range which can pass through the aforesaid filter 118 and transmits light in the other wavelength range. The reflected beams are directed upwardly as viewed in FIG. 14, without interrupting the light beams required for photography and reach two light receiving elements 126, 126' disposed in the focal point of the focusing optical system 104. It will thus be readily seen that on the same principle as that described with respect to FIG. 1, there may be formed on the light receiving elements 126, 126' images of two light spots determined by the positional relationship between the merging point of the two projected light beams and the distance at which the focusing system 104 is properly focused, or an image of two light spots registered with each other.

The outputs of the light receiving elements 126 and 126' together with the outputs of pulse generating photoelectric elements 127, 127' provided on the back sides of half-mirrors 113, 114, respectively, are guided to the electric circuit 128 whose construction is shown in FIG. 6. The electric circuit 128 supplies a servomotor 129 with a signal whose sign and amplitude are determined by the relationship between the merging point of the two beams and the distance at which the focusing optical system 104 is properly focused. The drive force of the servomotor 129 is transmitted through gear train 130, transmission shaft 131 and pinion 132 to interval gear 133 provided within the lens tube 134 in which the focusing optical system 104 is held, thereby moving the focusing system 104 until coincidence is attained between the merging point of the two light beams and the distance at which the focusing optical system is properly focused.

Member 135 is held by guide members 136, 137 and biased into contact with one end of the lens tube 134 the automatic focusing system 104 by the force of a spring 138 secured to the guide member 136, so that the member 135 can strictly follow any axial movement of the focusing optical system 104 and a rack 141 formed at the other end of the member 135 causes, via gear 139, the shaft of variable resistor 140 to rotate. It has already been noted that the resistance value of the variable resistor 140 represents the position of the focusing optical system 104 and provides a corresponding signal to the position setting circuit 217.

On the other hand, member 119 has one end thereof secured to the vibrator 122, which is movable, by rotation of a knob 142 provided extraneously, in the same direction as that of vibration of the chopper 121. Further, by employing such an arrangement that when the knob 142 is in its initial position, a third aperture 143 formed in the chopper 121 lies in the optical path $c$ while the aperture 123 lies in the optical path $b$ and the light source casing 120 suspended by member 119 is deviated from the optical path $a$, it will evidently be possible to observe a double image of an object within the viewfinder through another small aperture 147 in a viewfinder frame 146 and through the optical system 145 and prism 109. This implies a great practical advantage that the field of view can be determined by the image of the object formed through the ordinary optical system and observed within the viewfinder frame 146 and that the double image seen through the other small aperture 147 may be utilized for manual focusing. On the other hand, when the knob 142 is withdrawn outwardly, the light source casing 120 is brought into the optical path a while the chopper comes to its predetermined operative position. Therefore, for example, by adopting such an arrangement that a portion 148 of the vibrator 122 can be utilized to close the main switch 149 of the automatic focusing system, change-over from a manual focusing operation to an automatic focusing operation and vice versa may be achieved simply by a single procedure of withdrawing or depressing the knob 142.

As will be appreciated from the foregoing description when the device of the present invention or any other automatic focusing device is incorporated in a photographic camera body, the optical systems both of the device and the camera can be used commonly without the need for any complex mechanism operatively interconnecting the picture-taking system and the automatic focusing system. Moreover, any parallax which would otherwise arise between the attached range finder and the picture-taking system can be entirely eliminated, and especially as in the device of the present invention, change-over between the manual and the automatic focusing operation can be used commonly, as noted in the embodiment described just above.

We claim:

1. A focusing device for projecting radiant rays on an object being photographed and effecting focusing by utilizing the radiant rays reflected by the object comprising, a radiation source;
means for projecting radiant rays including at least one projecting optical system disposed in the path of the radiant ray from said radiation source for projecting said radiant rays alternately in time-sharing as two or more marks on the object;
radiant ray receiving means including an image forming lens member opposed to the object and at least one radiant ray receiving element disposed substantially in the focal plane of said lens member, said radiant ray receiving element being adapted to receive the image of the reflected radiant rays from the object and convert it into an electrical signal;

means for time-sharing the output derived from said radiant ray receiving means and converted from said reflected radiant rays;
drive means operatively connected to at least a portion of said means for projecting radiant rays and for varying the separation or registry of at least one pair of said marks projected on said object, and
control means for detecting the time-shared output signal from said radiant ray receiving means to control said drive means so that the projecting direction of radiant rays projected may be controlled by adjusting at least a portion of said means for projecting radiant rays.

2. A focusing device according to claim 1, wherein said time-sharing means further includes a mechanical chopper having open and closed sections, the angle subtended by each open section with respect to the center of rotation and the angle subtended by each closed section with respect to the center of rotation being at a ration of 1:3.

3. A focusing device according to claim 1, wherein said radiant ray receiving means further includes an electric circuit adapted to derive the output from at least one pair of radiant ray receiving elements responsive to the time-shared reflected radiant rays in the form of signals of different signs.

4. A focusing device according to claim 1, wherein said drive means is connected also to at least a portion of said radiant ray receiving means and thereby being adapted to vary the focused condition of the image of the object formed on said radiant ray receiving element of said radiant ray receiving means.

5. A focusing device according to claim 1, wherein at least a portion of said radiant ray projecting means and said image forming lens member in said radiant ray receiving means have a common optical system.

6. A focusing device according to claim 1, wherein said radiant ray receiving means further includes at least two photoelectric converter elements disposed in the path of the radiant ray from said radiant ray source to the object, and said control means includes a pulse generation circuit, said photoelectric converter elements being connected with said pulse generation circuit so that the outputs from the converter elements synchronously oscillate the pulse generation circuit.

7. A focusing device according to claim 6, wherein said control means further includes a phase discrimination circuit connected with said pulse generation circuit and adapted to discriminate phases of the output signals from said radiant ray receiving elements with the aid of synchronized signals applied from said pulse generation circuit to said discrimination circuit.

8. A focusing device according to claim 1, wherein said radiation source includes a light emissive means.

9. A focusing device according to new claim 8, wherein said light emissive means includes a tungsten lamp.

10. A focusing device according to new claim 8, wherein said light emissive means includes a laser device.

11. A focusing device according to new claim 8, wherein said light emissive means includes a luminous diode.

12. A focusing device according to new claim 8, wherein said light emissive means includes a xenon lamp.

13. A focusing device according to claim 1, wherein said at least one radiant ray receiving element of said radiant ray receiving means has its radiant ray receiving surface provided with a ray-intercepting mask or filter so that the intensity of the radiant rays transmitted through said radiant ray receiving element is continuously varied in one direction.

14. In combination with a photographic camera having a housing, an automatic focusing device for projecting radiant rays on an object being photographed and automatically effecting focusing by utilizing the radiant rays reflected by the object comprising, a radiation source;
means for projecting radiant rays including at least one projecting optical system disposed in the path of the radiant rays from said radiation source for projecting said radiant rays alternately in time-sharing as two or more marks on the object;
radiant ray receiving means including an image forming lens member opposed to the object and at least one radiant ray receiving element disposed substantially in the focal plane of said lens member, said radiant ray receiving element being adapted to receive the image of the reflected radiant rays from the object and convert it into an electrical signal;

means for time-sharing the output derived from said radiant ray receiving means and converted from said reflected radiant ray;

picture-taking optical means having an optical system displaceable along the optical axis thereof for photographing the object;

drive means operatively connected to at least a portion of said means for projecting radiant rays and for varying the separation or registry of at least one pair of said marks projected on said object;

control means for detecting the time-shared output signal from said radiant ray receiving means to control said drive means so that the projecting direction of radiant rays projected may be controlled by adjusting at least a portion of said means for projecting radiant rays;

a photographic camera body, and means for coupling said automatic focusing device to said camera body.

15. An automatic focusing device according to claim 14, wherein said drive means is connected also to at least a portion of said radiant ray receiving means, and thereby being adapted to vary the focused condition of the image of the object formed on said radiant ray receiving element of said radiant ray receiving means.

16. An automatic focusing device according to claim 15, wherein said image forming lens member in said radiant ray receiving means has substantially the same focal distance as the optical system of said picture-taking optical means.

17. An automatic focusing device according to claim 14, wherein said control means further includes a position setting circuit for the picture-taking optical means, said circuit being supplied with an information input representing the position of said optical system common to said radiant ray projecting means and said radiant ray receiving means, thereby setting the position of said picture-taking optical system when distance measurement is impossible or when the object is at infinity.

18. An automatic focusing device according to claim 14, wherein said control means further includes means for indicating the position of the optical system of said picture-taking optical means, said indicating means providing the positional information of said picture-taking optical system to the photographic camera body with which said automatic focusing device is combined.

19. An automatic focusing device according to claim 18, wherein the position setting of said picture-taking optical system is accomplished in accordance with the information from the position setting means thereof when distance measurement is impossible or when the object is at infinity.

20. An automatic focusing device according to claim 14, wherein said means for coupling said automatic focusing device to said photographic camera body includes electrical connecting means and mechanical coupling means, said latter means having coupling member for integrally coupling said automatic focusing device to said photographic camera body.

21. An automatic focusing device according to claim 14, wherein said radiation source and said radiant ray receiving element in said radiant ray receiving means have substantially an equal optical distance with respect to said optical system common to said radiant ray receiving means and said radiant ray projecting means.

22. In combination with photographic camera having picture-taking means, a shutter releasing button, a view-finder system and housing, a focusing device for projecting radiant rays on an object being photographed and automatically effecting focusing by utilizing the radiant rays reflected by the object comprising, a radiation source;

means for projecting radiant rays including at least one projecting optical system disposed in the path of the radiant ray from said radiation source for projecting said radiant rays alternately in time-sharing as two or more marks on the object;

radiant ray receiving means including an image forming lens member opposed to the object and at least one radiant ray receiving element disposed substantially in the focal plane of said lens member, said radiant ray receiving element being adapted to receive the image of the reflected radiant rays from the object and convert it into an electrical signal;

means for time-sharing the output derived from said radiant ray receiving means and converted from said reflected radiant rays;

drive means operatively connected to at least a portion of said means for projecting radiant rays and for varying the separation or registry of at least one pair of said marks projected on said object;

control means for detecting the time-shared output signal from said radiant ray receiving means to control said drive means so that the projecting direction of radiant rays projected may be controlled by adjusting at least a portion of said means for projecting radiant rays, and means for coupling said focusing device to said photographic camera.

23. A focusing device according to claim 22, wherein said drive means is connected also to at least a portion of said radiant ray receiving means and thereby being adapted to vary the focused condition of the image of the object formed on said radiant ray receiving element of said radiant ray receiving means.

24. A focusing device according to claim 23, wherein said image forming lens member in said radiant ray receiving means has substantially the same focal distance as the optical system of said picture-taking optical means.

25. A focusing device according to claim 22, wherein said means for coupling said focusing device to said photographic camera further includes electrical connection means and mechanical coupling means, said latter means having a coupling means for integrally coupling said focusing device to said photographic camera.

26. A focusing device according to claim 25, wherein said electrical connection means includes a connector member connectable to means for indicating the distance measurement within the viewfinder of said photographer camera.

27. A focusing device according to claim 25, wherein said electrical connecting means includes a connector member connectable to alarm means adapted to indicate the impossibility of distance measurement.

28. A focusing device according to claim 25, wherein said electrical connection means includes an electrical connector member for driving said focusing device, said connector member being connectable so as to control the operation and stoppage of said focusing device in response to the movement of the shutter releasing button of said photographic camera.

29. A focusing device according to claim 25, wherein said electrical connection means includes a member for connection with a power source.

30. A focusing device according to claim 22, wherein said radiation source and said radiant ray receiving element in said radiant ray receiving means have substantially an equal optical distance with respect to said optical system common to said radiant ray receiving means and said radiant ray projecting means.

31. A photographic camera containing therein means for projecting radiant rays on an object being photographed and automatically effecting focusing by utilizing the radiant rays reflected by the object comprising, a radiation source;
picture-taking optical means having a focus adjustment;
means for time-sharing the radiant rays from said radiation source, and for causing them to be projected through said projection means alternately in at least one pair of paths to produce at least one pair of luminous marks on said object, said time-sharing means being arranged to operate during automatic focusing and to block said radiant rays continuously during exposure,
radiant ray receiving means including an image forming lens member opposed to the object and at least one radiant ray receiving element disposed substantially in the focal plane of said lens member, said radiant ray receiving element being adapted to receive the image of the reflected radiant rays from the object and convert it into an electrical signal;

drive means operatively connected to said focus adjustment of said picture-taking optical means and to at least a portion of said means for projecting radiant rays for varying the separation or registry of at least one pair of marks projected on said object; and
control means for detecting the time-shared output signal from said radiant ray receiving means to control said drive means so that the projecting direction of radiant rays projected may be controlled by adjusting at least a portion of said means for projecting radiant rays.

32. A photographic camera according to claim 31, wherein said radiant ray receiving means further includes at least two photoelectric converter elements disposed in the path of the radiant ray from said radiant ray source to the object, and said control means includes a pulse generation circuit, said photoelectric converter elements being connected with said pulse generation circuit so that the outputs from the converter elements synchronously oscillate the pulse generation circuit.

* * * * *